No. 616,750. Patented Dec. 27, 1898.
C. TRIBUZIO.
VALVE FOR PNEUMATIC TIRES.
(Application filed Aug. 22, 1898.)
(No Model.)
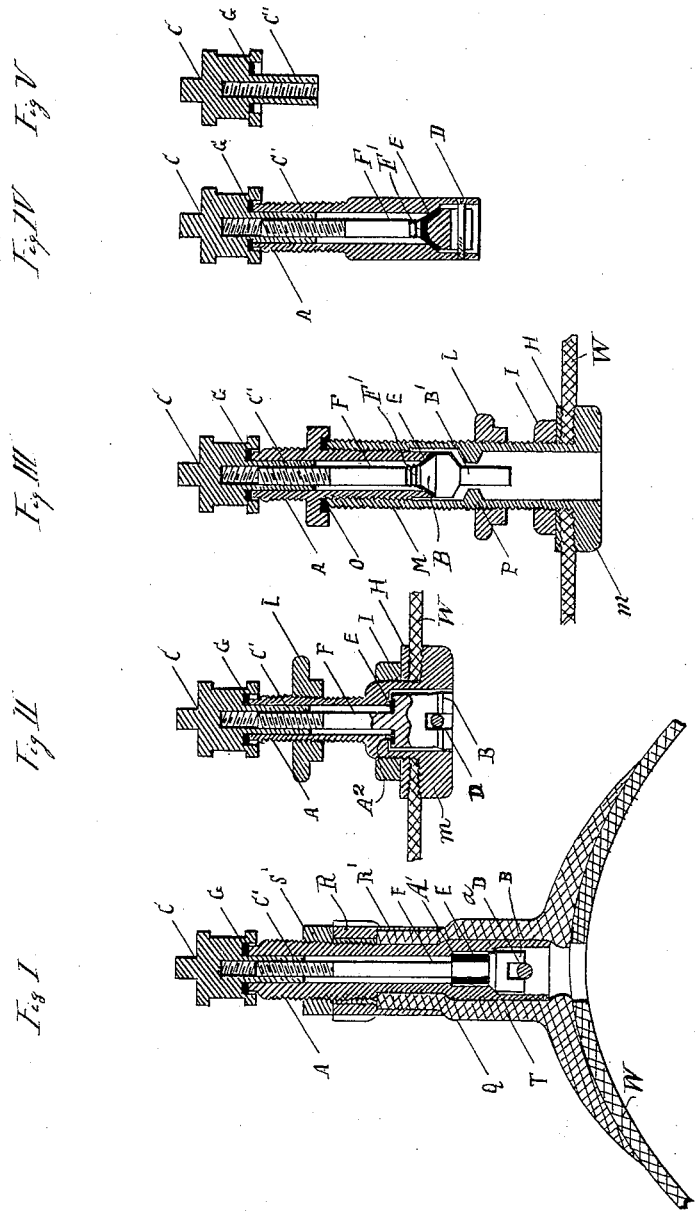

UNITED STATES PATENT OFFICE.

CATELLO TRIBUZIO, OF TURIN, ITALY, ASSIGNOR OF ONE-HALF TO BENDER & MARTINY, OF SAME PLACE.

VALVE FOR PNEUMATIC TIRES.

SPECIFICATION forming part of Letters Patent No. 616,750, dated December 27, 1898.

Application filed August 22, 1898. Serial No. 689,242. (No model.)

*To all whom it may concern:*

Be it known that I, CATELLO TRIBUZIO, a subject of the King of Italy, residing at Turin, in the Kingdom of Italy, have invented a certain new and useful Improvement in Valves for Pneumatic Tires and the Like, of which the following is a specification.

The object of my invention is to provide an improved valve for pneumatic tires of bicycles or other vehicles or for other containers or apparatus intended to hold compressed air or gases.

The invention is illustrated in the accompanying drawings, in which—

Figure 1 is a section of one form of the valve fixed onto a rubber valve-casing. Fig. 2 is a section of another form of the valve arranged to be directly attached to the inner tube or air-tube of a pneumatic tire. Fig. 3 is a section of another form in which the valve is screwed to a metallic casing, the latter allowing of its attachment to the air-chamber for the purpose of facilitating the removal and repair of the valve. Fig. 4 is a section of another form of the valve alone without any means for attaching it to an air-chamber, and Fig. 5 represents its cap.

The same letters of reference indicate corresponding parts in all the figures.

Referring first to the form shown in Fig. 1, A is the body of the valve. F is a valve-rod in same; B, the lower part or valve proper, which in this case is cylindrical and has a conical upper part which abuts against a corresponding conical shoulder or seat $a$ of the body A, a packing of rubber, leather, or other suitable material E surrounding the rod F at its lower part and abutting against a further shoulder A' of the body A. This shoulder A' may be conical, if desired, and in connection with the seat $a$ provides, as will be seen, a double check to the escape of air.

In order to limit the movement of the valve B and to prevent it from turning round, its end is provided with a notch, across which lies a pin or screw D, which is held in the body of the valve. Said screw and notch could also be arranged at any other suitable point along the rod F. The upper end of the rod F is threaded to receive a cap C, which is also independently represented in Fig. 5, such cap having an extension C', adapted to extend downwardly around the rod on which it is screwed and between it and the body A, which is not screwed, nor is the extension at these points. A washer G, of leather or other suitable material, is placed in an annular recess in the cap C to act as a packing. The object of the cap is to more completely insure the air-tight closing of the valve B against its seat by the tension exercised on the rod F when it is screwed on and at the same time to produce a second closing-point at the packing G. This packing can, however, be dispensed with, the closing being then confined to the valve, assisted by the tension of the cap; but the addition of the packing G is of service, and it is accessible for renewal. The downwardly-extending part C' of the cap may be dispensed with, and the cap may also be screwed directly onto the body A; but the arrangement described is preferred.

The air is introduced in the ordinary way—that is to say, after having unscrewed the cap C the flexible or other tube of a pump is screwed onto the upper extremity of the body A of the valve, the latter being provided with suitable threads for the purpose. By operating the pump the compressed air is caused to force down the valve and to enter into the air tube or chamber or other receptacle to which the valve is attached. The air cannot escape because of the back pressure of the compressed air automatically closing the valve B and pressing it upon its seat. When the chamber is sufficiently filled, the pump-tube is unscrewed and replaced by the cap, which completes the closing of the valve.

Other forms of cylindrical valves having conical heads may be employed over that illustrated.

In Fig. 2 the valve B is cylindrical; but its upper surface is flat and is recessed to receive an annular packing-ring E, which abuts against an annular rib $A^2$ on a shoulder of the body portion A.

In Fig. 3 the valve has a packing E on its conical part, and to keep the packing in place the rod F' may have notches F' of the shape of saw-teeth, while below said valve is a flat prolongation B', which passes between two lugs P in a casing M and serves to guide the rod F. The cylindrical part is larger than the conical part, so that a seat for the packing E is secured.

In Fig. 4 the packing E is conical. The body portion is cylindrical and is guided by a slot and screw D.

For attaching the valve to the receptacle or air-container many ways can be made use of; but I prefer the following three methods, which form part of my invention and which are represented in Figs. 1, 2, and 3.

In Fig. 1, which is an arrangement adapted for pneumatic tires, the valve is so arranged as to be attached to the air-receptacle W by means of a rubber casing T, strengthened by a covering of linen or canvas and cemented on or forming one and the same body with the receptacle W. The lower part of the body A of the valve is enlarged at Q. A sleeve R screws upon the body of the valve and has an extension R', which slips over the tubular part of the casing T. Said sleeve R is kept in position by means of a nut S, which also screws on the body A, so that the valve is solidly secured in the tubular part of the valve-casing, the escape of air being completely prevented.

In Fig. 2 its valve is arranged so as to be directly fixed to the receptacle W. The body A of the valve is provided at its bottom part with a flange $m$, which comes on the inside of the receptacle W, the rest of the valve projecting through a hole in same, and on the other side of the receptacle is a washer or nut H, which is held down by a nut I. The surfaces of the flange $m$ and washer H, between which the material is held, are provided with circular grooves of saw-teeth-like section in order to hold the valve to the material. The nut I and the corresponding threads of the body of the valve are left-handed—that is to say, are cut in the reversed sense of the ordinary screws—in order to prevent the nut from loosening when the cap or the flexible tube is screwed on. L is the ordinary nut screwing on the body portion A to hold the valve and receptacle W to the rim of a vehicle-wheel.

Fig. 3 represents the body A so arranged as to be attached to the receptacle W by an intermediate metal tube or casing M, which means will facilitate the dismounting of the valve. The casing M is provided with a flange $m$ and a washer H, also with a nut I and a second nut L, which are all arranged in the same manner as above described and serve the same purpose.

The valve is screwed into the casing M and has a flange N, which rests on the upper end of the casing by means of a packing O, of leather or of any other suitable material, placed in a recess of the flange, so as to form an air-tight joint.

What I claim is—

1. In a valve for pneumatic tires and the like and in combination, a valve portion having a conical surface, the valve-body, the latter having a conical seat for the valve and a second shoulder, the valve-rod and a packing around same adapted to bear against the second shoulder substantially as and for the purpose described.

2. In a valve for pneumatic tires and the like and in combination, a valve portion of cylindrical shape having an annular packing and the valve-body having a valve-seat and a shoulder on which the packing seats, substantially as described.

3. In a valve for pneumatic tires and the like, and in combination, the tire, a valve, body portion having an enlarged part, a screw-threaded portion, a sleeve carried by same, an extension on same, a rubber casing having a tubular part, said casing being attached to the tire, and said tubular part being adapted to be covered by the extension of the sleeve and to be squeezed on the enlargement of the valve-body substantially as and for the purpose described.

4. In a valve for pneumatic tires, the combination with a valve-body, a valve-seat in the said valve-body, and a shoulder also in the said valve-body, of a valve adapted to close against the said seat, and having a stem screw-threaded at its outer end, packing around the said valve-stem adapted to close against the said shoulder on the valve-body, a cap adapted to screw upon the said valve-stem, an annular recess in the said cap, a packing-ring in the said recess, adapted to rest upon the end of the valve-body, substantially as described.

5. In a valve for pneumatic tires, the combination with a valve-body having an enlarged portion at one end and an exteriorly-screw-threaded portion, a valve-seat in the said valve-body, a shoulder also in the said valve-body, a valve adapted to close against the said seat, the said valve having a stem screw-threaded at its outer end, a packing around the said stem to close against the said shoulder, and a cap adapted to screw upon the said stem and having a packing-ring to rest upon the end of the said valve-body: of a rubber casing secured to the tire and having a tubular portion adapted to inclose the said enlarged portion of the said valve-body, a sleeve adapted to screw upon the screw-threaded portion of the valve-body, and having an extension to inclose the end of the tubular portion of the said rubber casing, substantially as described.

In testimony whereof I have hereunto set my hand in the presence of two subscribing witnesses.

CATELLO TRIBUZIO.

Witnesses:
RAFFAELE ROSSE,
G. M. VARVELLI.